March 8, 1955

D. H. KELLY 2,703,506

LIGHT BEAM LINKING OPTICAL FOCUSING
SYSTEM OF THE SCHMIDT TYPE

Filed March 30, 1951

Inventor
Donald H. Kelly
by Roberts, Cushman & Groves
Att'ys.

March 8, 1955

D. H. KELLY 2,703,506

LIGHT BEAM LINKING OPTICAL FOCUSING
SYSTEM OF THE SCHMIDT TYPE

Filed March 30, 1951

Inventor
Donald H. Kelly
by Robb, Cushman & Grove
att'ys.

United States Patent Office 2,703,506
Patented Mar. 8, 1955

2,703,506

LIGHT BEAM LINKING OPTICAL FOCUSING SYSTEM OF THE SCHMIDT TYPE

Donald H. Kelly, Los Angeles, Calif., assignor to Technicolor Motion Picture Corporation, Hollywood, Calif., a corporation of Maine Application March 30, 1951, Serial No. 218,457

18 Claims. (Cl. 88—24)

The problem of linking light beams which carry the same image arises in various fields of applied optics, particularly in color television. For the additive reproduction of color aspect components of an original scene, the respective image carrying beams have heretofore been formed mainly by means of refracting lenses focusing two or more color aspect records onto a projecting screen. Conventional lenses usable for these purposes are however limited to aperture speeds of about F/2. Such aperture speeds are inadequate for many purposes requiring the combining of light beams, such as for example simultaneous projection of three color television images originating at the fluorescent emitting surfaces of three cathode ray tubes. The linking of image carrying beams originating with cathode ray tubes is particularly difficult because in this instance the light source itself constitutes the original object field in the form of a surface emitting through a hemispherical angle within which conventional projection systems can gather only a relatively small portion of the actually emitted light energy. This inherent difficulty will be apparent upon comparing a self-emitting image with the projecting of comparatively small photographic records, in which instance light emitted through a fairly large angle by an independent light source can be concentrated in a narrow beam directed through the film frame.

In order to alleviate this difficulty, it has heretofore been proposed to project television receiver surfaces by means of spherical reflectors, with the aid of transparent corrector plates, such arrangements being known under the name "Schmidt Systems" which can be well corrected for coma, astigmatism and spherical aberration as well as for curvature of field and image distortion. However if such systems are arranged in analogy with the multiple lens projection systems heretofore used, insuperable drawbacks arise for most practical applications, mainly due to an unavoidably large parallax. Such parallax can be avoided only by an unreasonably great distance between screen and projector, or by introducing another defect namely keystoning. The parallax of projective systems which are arranged side by side, can be avoided by means of semi-transparent reflectors which link intersecting component and resultant beams without inherent parallax. While these systems are satisfactory so far as parallax is concerned, they are inapplicable to conventional Schmidt systems because the inherent geometry of a combination of three such systems does not allow for the insertion of linking surfaces. If three cathode ray tubes and the necessary conventional transparent reflectors were placed into the focal plane of a conventional Schmidt system, the tubes themselves would block the aperture of the system to such an extent that no light gain would be obtained. On the other hand the use of three conventional Schmidt systems would require impossibly large and cumbersome transparent reflectors.

While the problem is above stated mainly with reference to projection systems, that is systems which combine or blend several component beams into a resultant beam, it applies analogously to beam resolving or dividing systems. Therefore, the present solution of the problem is herein characterized in terms of linking generally, in the sense of interrelating component and resultant beams.

It is a principal object of the present invention to provide a system for linking component and resultant beams carrying optically registered images of an object field. In a preferred embodiment, the object is to combine three component beams carrying color aspect images originating in television receiver tubes for projection on a screen, with a system that inherently avoids parallax, collects an optimum amount of available light energy, and therefore permits the projection of color television images of a brightness similar to that heretofore only possible with black and white television projectors. Other objects are to provide additive projection of color aspect images on fairly large screens, with a minimum number of optical elements of optimum size, and generally to provide an inherently efficient and theoretically correct, but at the same time simple and easily adjustable system of the above type, which is comparatively inexpensive as to initial cost as well as upkeep.

In accordance with my invention, these objects are achieved with an optical system of the Schmidt type having a set of curved reflecting surfaces and corrector surfaces, shaped and arranged symmetrically to an axis of optical alignment for imaging one on the other of two picture surfaces arranged on respective sides of the reflecting surfaces, combined with a third or more picture surfaces and one or more light beam linking surfaces in the nature of transparent reflectors, the linking and third picture surfaces occupying a space between a reflecting and one of the other picture surfaces, the relative distances and inclinations of the reflecting, picture and linking surfaces being selected to secure the imaging upon each other of the three picture surfaces as optically related by the linking, reflecting, and corrector surfaces. The linking surfaces and all but one linked picture surface are located in that space outside of the reflecting surfaces where the imaging rays are comparatively flat with respect to the axis of alignment. Suitable arrangement, according to the invention, of linking and picture surfaces within this space, renders these systems particularly well suited for correlating three or more component beams.

In a more specific, but practically important aspect of the invention, the first picture surface is a projecting screen, and the second and third surfaces are the light emitting screens of television receiver tubes.

In a further aspect, especially important in the field of three color television, a fourth picture surface is introduced, for example in the form of an emitting screen similar to the above mentioned second and third surfaces, by means of a second beam linking surface which is generally speaking similar to, and forms with the first linking surface a linking system; this linking system may be arranged in various ways as will be apparent hereinbelow, with intersecting or parallel linking surfaces.

In another important aspect, the linking surfaces are dichroic reflectors of previously described construction which are designed so as substantially totally to reflect one or two distinct spectral ranges, while transmitting substantially all light of the complementary ranges, so that very little loss of light occurs at the linking surfaces. Theoretically perfect dichroic reflectors used within the concept of my invention have three times the efficiency of neutral color metallic reflectors, which assures efficient utilization of the available total light energy. A particularly important feature of my invention is the above mentioned utilization of two reflector Schmidt systems which accommodate a beam linking system of practical size, due to the fact that their steep ray zone lies between the two mirrors whereas the flat ray zone is available for the linking system and the tubes.

In an additional aspect, the invention permits the use of either a beam linking system with two or more parallel linking surfaces perpendicular to the optical axis, or a linking system with two intersecting surfaces, these systems being located close to the curved mirror in the aforementioned flat ray zone.

In a still further aspect, the invention contemplates the combination, on a single curved support, of a reflecting and a linking surface, further combined with a compensating refractive body; this embodiment provides a three color system with only two reflector bodies, one carrying a linking surface, one additional linking body, and the corrector plate.

Other objects, aspects and features will appear, in addition to those contained in the above statement of the nature and substance including some of the objects of the invention, from the herein presented exposition of its basic principles, and from the following description of several typical practical embodiments illustrating its novel characteristics. This description refers to drawings in which.

Figure 1:
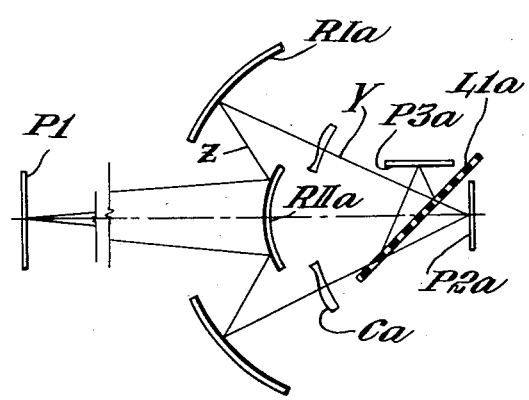
Figs. 1 and 2 are diagrams of the basic optical arrangement according to the invention, in two variations.
Figure 2:
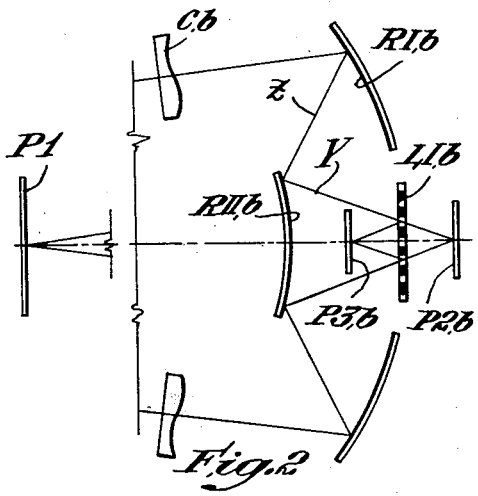
Figure 3:
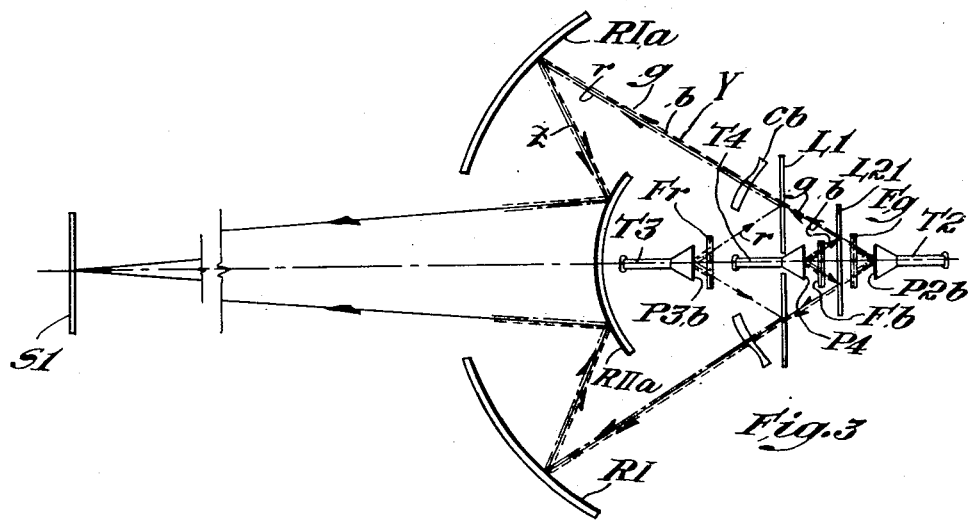
Fig. 3 is the schematical view of a color television receiver incorporating a two element projecting reflector according to Fig. 1 and a linking surface system according to Fig. 2.
Figure 4:
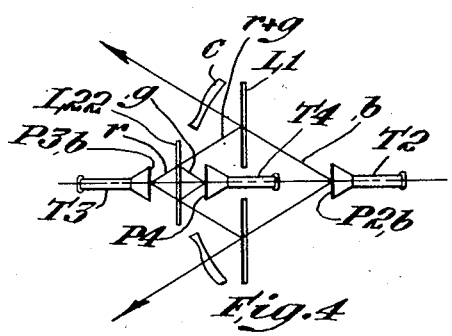
Fig. 4 shows a modification of the beam linking system according to Fig. 3, otherwise arranged as in Fig. 3.
Figure 5:
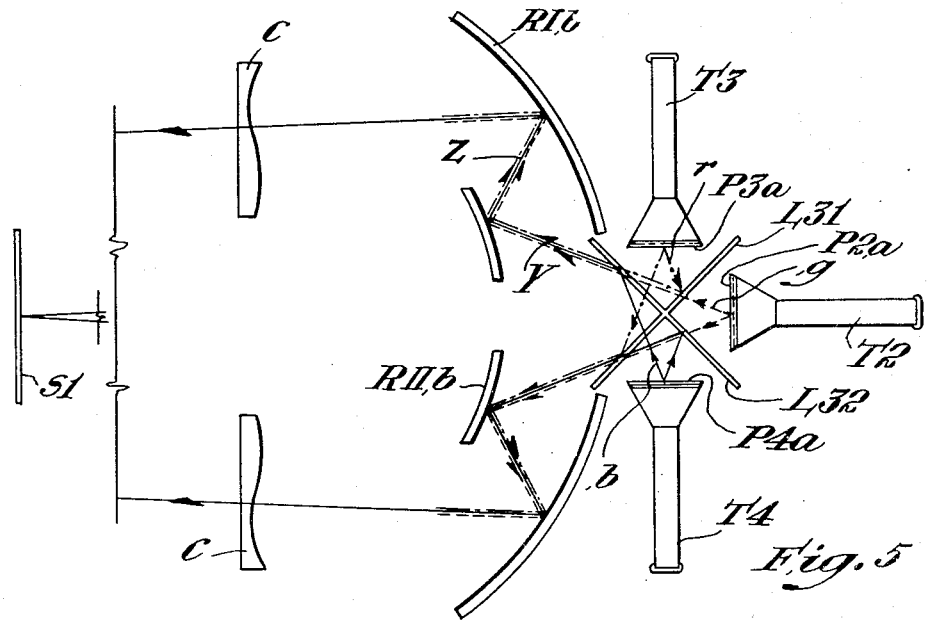
Figure 6:
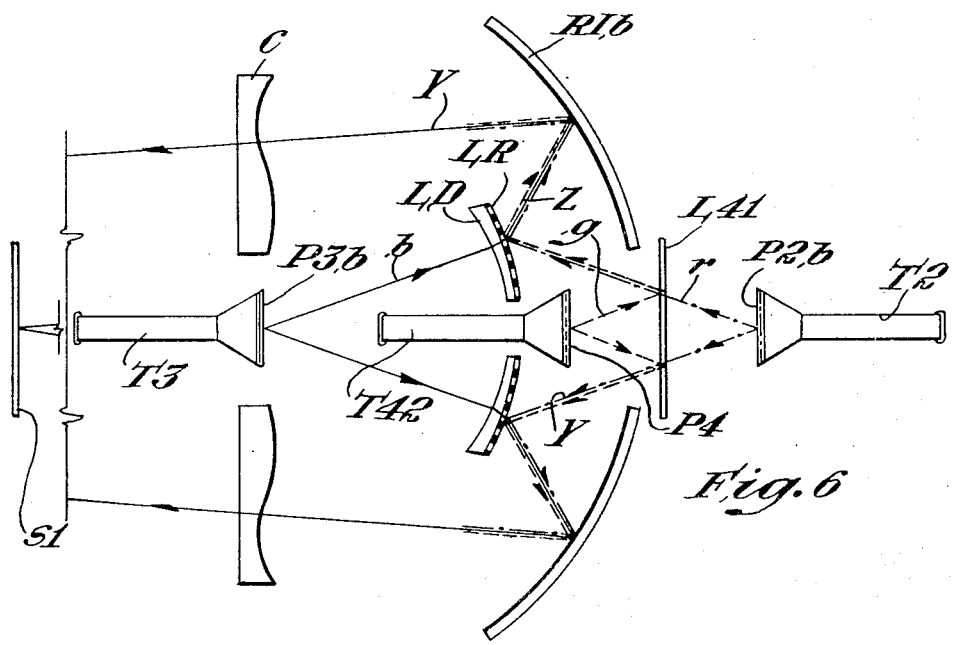

Fig. 5 is a diagram, similar to that of Fig. 3, of a color television receiver system incorporating a projector according to Fig. 2 with a beam linking system of the general nature of that shown in Fig. 1, but with two intersecting linking surfaces; and Fig. 6 is a diagram similar to that of Fig. 5 but with a linking system of the general nature of that shown in Figs. 2, 3 and 4, and with a curved linking surface on one of the reflectors.

In order to facilitate the perusal of the present specification and claims, its more important and significant concepts and the terms herein associated therewith will first be shortly discussed as follows.

"Record" is herein used for tangible reproductions or representations of pictures or symbols in any medium such as metallic silver, dye, ink, or defined by molecular or atomic modification such as latent silver halide records, vectograms, fluorescent layers including electron beam controlled emitters, and capacity patterns; the term "image" on the other hand is used for the "optical counterpart of any object produced by any optical system" (Webster). In this connection, it will be understood that the term "imaged" is not restricted to imagery in a single direction, but includes the imaging of one surface upon another in either direction. "Surface" is used essentially in its geometrical connotation, that is a two dimensional space, whether plane or curved. "Picture surface" means any such surface wherein either a record or an image, in the above sense, appears, can be detected, or is otherwise effective. The term includes projection screens, photographic film records, picture screens of electron image scanning devices such as television sending or receiving tubes, and actual object fields. A "linking surface" is a surface which associates either by way of combining or analyzing a plurality of image carrying light beams; semi-transparent metallic reflectors as well as thin layer dielectric interference coatings are examples of such linking surfaces. "Reflecting surfaces" are total reflectors such as metal coated plane or curved glass bodies. "Spectral range" as herein used includes not only ranges of the visible spectrum, such as the blue, green and red ranges employed in three color photography or three color television, but also invisible ranges in so far as they can be utilized in systems of this general type, such as the infra-red and ultra violet ranges. "Filters" are understood to include any means for segregating a predetermined spectral range from a larger spectral range.

In Fig. 1, two picture surfaces P1 and P2a are imaged upon each other by the two reflector Schmidt system RIa, RIIa, Ca. As clearly indicated in Fig. 1, reflector RIa concavely faces picture surface P1 and is apertured to pass rays reflected at RIIa. A corrector plate Ca of known construction is arranged between the reflector system and picture surface P2a, to compensate for coma, astigmatism, and spherical aberration; field curvature and distortion being taken care of by appropriate coordination of the reflector and picture surface configurations.

A transparent reflector L1a is arranged between the reflector system RIa, RIIa and the picture surface P2a. This linking surface L1a can be a thin metallic mirror which partly transmits and partly reflects the light incident thereon from either side, but is preferably an interference type reflector with several thin layers of dielectric material, of well known construction. This linking system L1a images on each other picture planes P1 and P2a as well as a third picture plane P3a in the manner clearly indicated in Fig. 1.

In the embodiment according to Fig. 2, a somewhat different reflector system is employed. In this system the convex reflector RIIb is optically adjacent to the picture surface P2b, and the other, concave reflector RIb is between the reflector RIIb and the picture surface P1. The corrector plate Cb is between P1 and RIb.

The beam linking system L1b is arranged between RIIb and P2b and consists of a transparent reflector of the above mentioned type, arranged at right angles to the optical axis of the system. In this instance, the third picture surface P3b is arranged parallel to the linking surface and the second picture surface, the second and third picture surfaces being symmetrical to the linking surface.

The operation of these systems will now be apparent without detailed explanation. In either instance three picture surfaces can be optically related in exact register. System L links picture surfaces P2 and P3 and these are imaged at P1 or vice versa. It will be apparent that P2 and P3 are linked without change of size, whereas P1 is considerably larger. It will be further apparent that both systems are very compact, particularly the one according to Fig. 2, which is mainly due to the fact that the steepest ray paths, as indicated at Z, lie between the two mirrors rather whereas the region containing the comparatively flat rays Y and the picture and linking surfaces lies outside the mirrors R. Thus, there is here about the same obstruction of axial or other rays than in any conventional Schmidt system, in spite of the fact that several picture surfaces are arranged in the center of the system. Although the central zone of a system of this type is somewhat less utilized than that of a conventional single reflector Schmidt system, the same speed can be obtained at suitable field angles by using deeper mirrors. This is feasible with two reflector systems while, if a reflector as deep as that herein shown were placed in a conventional Schmidt system the marginal zones would be completely hidden from the picture area.

With reference to Figs. 3 to 6, several specific embodiments, all color television receiving systems, will now be described.

The system shown in Fig. 3 is generally speaking similar to that described above with reference to Fig. 1. Specifically, the smaller, convex, or secondary mirror RIIa is located about half way between the larger, concave, primary mirror RIa, and the center of curvature of the latter, which is also the center of the smaller mirror. The centers of curvature of the two mirrors should coincide in order to reduce the necessary correction of residual aberration, taken care of by corrector plate Cb.

The light emittent phosphor screens of the television tubes are designated with the characters applied to the picture surfaces generally in Figs. 1 and 2.

The first picture surface corresponding to P1 of Fig.1 is in this instance a conventional projector screen S1, and the picture surfaces P2b, P3b and P4 are the light emitting screens of three television receiver tubes T2, T3 and T4. The linking system includes in this instance a second linking surface L21, in addition to L1 which corresponds to L1a and L1b of Figs. 1 and 2 respectively. Tubes T3 and T4 occupy space which is not ordinarily utilized in systems of this type, even by a single tube for black and white television.

It will now be evident that the image carrying beams originating in tubes T2 and T4 are linked at L21 and that the first combination beam is further combined with the beam from P3b, at linking surface L1. From the latter surface, the final combined beam is reflected, at RIa and RIIa, towards screen S1. The various picture surfaces are optically symmetric relatively to the linking surfaces.

The operation of this system, as well as special provisions for that purpose will be described with reference to all specific embodiments, since these are essentially the same in each instance.

In the embodiment according to Fig. 4, the reflectors and screen and the arrangement of the first linking surface L1 are the same as in Fig. 3. The second linking surface, here L22, however is mounted on the other side of L1, between tubes T3 and T4, which latter is turned around as compared to Fig. 3.

The receiver according to Fig. 5 has a reflector system similar to that described above with reference to Fig. 2, as indicated with corresponding identification marks, and it has a linking system derived from that shown in Fig. 1.

To the linking surface L1a of Fig. 1, corresponding to L31 in Fig. 5, has been added a second linking surface L32. The two linking surfaces intersect at the opitcal axis. The three tubes T2, T3 and T4 emit light beams which are linked to the main beam Y—Z, as clearly indicated in Fig. 5 with appropriate arrows.

The two mirrors are again essentially concentric, the radius of the smaller convex mirror being about two-thirds of that of the larger concave mirror. As previously mentioned, the centers of curvature of the two mirrors should coincide in order to facilitate correction of residual aberrations. Specific characteristics and construction features of this system, as related to its purpose as color television receiver, will be described more in detail below.

The system of the embodiment according to Fig. 6 is similar to that described above with reference to Figs. 2 and 5, but with the following improvements according to the present invention.

The linking surface L1 of Figs. 2, 3 and 4 is here replaced by a curved semi-transparent reflector LR, applied to a refracting element LD essentially in the position of element RIIb of Fig. 5. This element LD is a negative meniscus lens of high index low dispersion glass. Coating LR serves as secondary reflector of the projector system (corresponding to RIIb of Fig. 2) and also as beam linking surface. It is coated on the meniscus lens LD as a thin layer interference structure with dichroic properties. In order to separate the two functions of the coating LR, as secondary reflector and linking surface respectively, the optical power of LD by refraction is the same as that of layer LR by reflection.

As shown in Fig. 6, the beams originating in tubes T2 and T42 are linked at L41, and the merged beam from L41 is at LR linked with the beam from tube T3. The composite beam is directed towards RIb and through corrector plate C towards the screen S1. Thus, the functions of reflector RIIb and of linking surface L1b of Fig. 2 are combined in LD—LR of Fig. 6.

Generally speaking, the arrangements according to Figs. 5 and 6 have slightly less speed than those according to Figs. 3 and 4, but the mirror diameters can be much smaller for a given tube size.

Coming now to the detail construction, particularly specific spectral characteristics of systems of this type as applied to color television receivers, it should first be kept in mind that they can be used either with tubes having the same phosphor emitting all three spectral ranges of a three color system, such as those generally referred to as blue, green and red, or with tubes having phosphors emitting different ranges such as these blue, green and red ranges respectively. If white emitting tubes are used, appropriate color filters of well known construction can be inserted at suitable points of the train of beams. As an alternative, and preferred embodiment, beam linking surfaces are used which at the same time discriminate as to color. These are of the thin layer interference coating type as for example dealt with in my copending application Serial No. 70,195, filed January 11, 1949, and now abandoned. Fig. 3 illustrates an embodiment with essentially identical tubes T2, T3 and T4 having picture screens with white phosphors indicated at P2b, P3b and P4. The appropriate color aspect ranges are selected by means of filters Fb, Fg and Fr, which transmit the blue, green and red spectral ranges respectively. In order to facilitate reading of the drawings, they indicate throughout "blue" ranges and rays by full lines, "green" by dotted lines and "red" by dot and dash lines. Linking surface L1 is a thin layer structure which reflects red and transmits blue and green light, while linking surface L21 reflects blue and transmits green light.

In Fig. 3, the center of curvature of the corrector plate Cb is at the face of tube T2 while the centers of curvature of reflectors RIa and RIIa are in the plane of the corrector plate.

As clearly indicated in Fig. 3 by the respective full, dotted, and dot and dashed lines b, g and r for blue, green and red light respectively, linking surface L21 combines the green and blue beams, and surface L1 adds the red beam for projection on screen S1.

In Fig. 4, linking surface L1 transmits blue and reflects green and red light, whereas L22 transmits red and reflects green light. Again the three ranges are combined as clearly indicated in the manner above explained. The filters have been omitted from Fig. 4; they correspond to those of Fig. 3.

Fig. 5 indicates the use of colored phosphors. Tube T2 has a green phosphor P2a, tube T3 a red phosphor P3a, and tube T4 a blue phosphor P4a as schematically indicated. Linking surface L31 reflects red and transmits green and blue, while the other surface L32 reflects blue and transmits red and green.

In Fig. 6, linking surface LR transmits blue and reflects red and green, while L41 transmits red and reflects green. In this embodiment, the blue definition is somewhat reduced by the absorption of the blue light in the meniscus lens LD, but this is of minor importance in three color systems since the blue component contributes little or nothing to the total definition of the picture.

It will be noted that metallic reflectors which are not or only imperfecly color selective, could be used in Fig. 3, but this would be quite inefficient because part of each beam would be lost upon linking, in addition to the loss due to use of white emitting phosphors with filters. The most efficient arrangement is that shown in Figs. 5 and 6, with color phosphors and dichroic reflectors. The efficiency of systems with metallic linking surfaces and colored phosphors, or with dichroic linking surfaces and white phosphors, is somewhere between the above outlined extremes.

It will now be evident that systems similar to Figs. 3 to 6 can be used for beam analyzing instead of combining purposes. For example, S1 can be replaced by a light issuing unit such as an original object field, a scene projected on a screen, or a film illuminated by a light source. Picture surfaces P2b, P3b and P4 can be for example the photoelectrically sensitive screens of cathode ray camera tubes. The colored beam issuing from S1 is then resolved into three component beams carrying respective color aspect images. The color discriminating properties of the linking surfaces are essentially those described above, while the color sensitivity properties of the sending tubes are adjusted for optimum efficiency.

It will be further evident that, with slight adaptation, component images can be combined which are correlated in ways other than as color aspects of a given object field, such as distinct areas of the field, for example background and foreground scenes.

It should be understood that the present disclosure is for the purpose of illustration only and that this invention includes all modifications and equivalents which fall within the scope of the appended claims.

I claim:

1. An optical system comprising a plurality of concavely and convexly curved reflecting surfaces and a corrector surface shaped symmetrically to an axis of optical alignment with said curved reflecting surfaces facing each other and arranged for imaging one on the other of two substantially parallel picture surfaces the first picture surface being on one side and the second picture surface on the other side of said curved reflecting surfaces, in combination with a light beam linking surface and a third picture surface positioned intermediate of said two picture surfaces, said linking surface and said picture surfaces being disposed on a beam axis in the space outside said curved reflecting surfaces and at operative distances and inclinations of said curved reflecting surfaces and linking surface whereby the said picture surfaces are imaged upon each other as optically related by said linking surface.

2. System according to claim 1 wherein a concave reflecting surface is optically adjacent to said beam linking surface and second and third picture surfaces and the other reflecting surface convexly faces the first picture surface and concave reflecting surfaces.

3. System according to claim 1 wherein a convex reflecting surface is optically adjacent to said beam linking surface and second and third picture surfaces, and the concave reflecting surface concavely faces the first picture surface and the convex reflecting surface.

4. System according to claim 1 wherein said beam linking surface intersects said optical axis at substantially a right angle, and with said second picture surface on one side and a third picture surface on the other side of said linking surface.

5. System according to claim 1 wherein said light beam linking surface obliquely intersects said optical axis, with said second and third picture surfaces on opposite sides of the linking surface.

6. System according to claim 1 further combined with a second beam linking surface and a fourth picture surface, said second linking surface and fourth picture surface being disposed to secure imaging of said second, third and fourth picture surface in said first picture surface.

7. System according to claim 6 wherein said second beam linking surface and said fourth picture surface are parallel and positioned on one side of said first linking surface between said first linking surface and said second picture surfaces.

8. An optical system comprising imaging means of the Schmidt type with at least a concavely and a convexly curved reflecting surface and a corrector surface shaped symmetrically to an axis of optical alignment, in combination with a picture surface on one side of said curved reflecting surface, and a group of picture screens of picture image producing devices and a beam linking system located symmetrically to said axis on the other side of said curved reflecting surfaces outside but closely adjacent to said reflecting surfaces, said picture screens being in optical symmetry relatively to said linking system to secure imaging of said picture surface and said picture screens on each other with picture screens and linking system in the beam which converges comparatively slightly towards the picture screens.

9. An optical system comprising a plurality of at least two concavely and convexly curved reflecting surfaces and a corrector surface shaped symmetrically to an axis of optical alignment, in combination with a first picture surface on one side of said reflecting surfaces and second, third and fourth picture surfaces and two linking surfaces on the other side of said reflector surfaces with said picture surfaces and with the linking surfaces normal to said axis, said second and third picture surfaces being in optical symmetry to one of said linking surfaces, and said second and fourth picture surfaces being in optical symmetry to the other linking surface, whereby said picture surfaces are imaged upon each other.

10. System according to claim 9, wherein said linking surfaces are thin layer interference coatings which transmit light of one spectral range and reflect light of another spectral range.

11. System according to claim 9, wherein said first picture surface is a projection screen, said second, third and fourth picture surfaces are picture screens each of which emits light of a different spectral range of distinct color, and one of said linking surfaces has a thin layer interference coating which reflects one of said ranges of distinct color and transmits another range of distinct color towards the other linking surface, and said other linking surface has a thin layer interference coating which combines the two said ranges of distinct color into a single beam producing a combined image on said projection screen.

12. An optical system comprising a plurality of concavely and convexly curved reflecting surfaces and a corrector lens body with surfaces shaped symmetrically to an axis of optical alignment in combination with a projecting screen and two light emitting picture surfaces and a linking surface, one of said curved reflecting surfaces including a transparent meniscus lens having on one of its surfaces a thin layer interference coating which partly transmits and partly reflects light impinging thereon, said coating constituting one of said reflecting surfaces and the said linking surface for combining light from said two light emitting picture surfaces, said light emitting picture surfaces being disposed in optical symmetry to said coating for securing the registering of the images of said picture surfaces on said projection screen.

13. System according to claim 12, wherein said picture surfaces are picture screens which emit colored light of two selected spectral ranges, and said coating transmits one spectral range and reflects the other one of said spectral ranges.

14. System according to claim 12, wherein said corrector lens body has a refractive effect which, together with the reflective effect of said thin layer interference coating, directs beams from said picture surfaces in register towards said reflecting surfaces and towards said screen.

15. System according to claim 6 wherein said second beam linking surface and said fourth picture surface are parallel and positioned on one side of said first linking surface between said first linking surface and said third picture surface.

16. System according to claim 1 wherein said first linking surface is curved and substantially coincident with said convex reflecting surface, and said second beam linking surface and said fourth picture surface are parallel and positioned between said first linking surface and one of said second and third picture surfaces.

17. System according to claim 1 further combined with a second beam linking surface and a fourth picture surface, said beam linking surfaces intersecting at right angles at the optical axis and said second linking surface and said fourth picture surface being disposed to secure imaging of said second, third and fourth picture surfaces in said first picture surface.

18. System according to claim 1 further combined with a second beam linking surface and a fourth picture surface, said first and second beam linking surfaces intersecting each other and said optical axis, said second, third and fourth picture surfaces being located at right angles relative to the optical axis as defined by said intersecting linking surfaces, and said fourth picture surface being disposed to secure imaging of said second, third and fourth picture surfaces in said first picture surface.

References Cited in the file of this patent

UNITED STATES PATENTS

| Number | Name | Date |
|---|---|---|
| 1,253,'38 | Brewster | Jan. 8, 1918 |
| 1,641,466 | Wright et al. | Sept. 6, 1927 |
| 1,688,606 | Wright et al. | Oct. 23, 1928 |
| 1,943,511 | Bauersfeld | Jan. 16, 1934 |
| 2,027,369 | Bourges | Jan. 14, 1936 |
| 2,041,194 | Lindenberg | May 19, 1936 |
| 2,380,887 | Warmisham | July 31, 1945 |
| 2,403,660 | Hayward | July 9, 1946 |
| 2,409,971 | Bennett | Oct. 22, 1946 |

FOREIGN PATENTS

| Number | Country | Date |
|---|---|---|
| 538,622 | Great Britain | Aug. 11, 1941 |
| 898,315 | France | July 3, 1944 |
| 61,355 | Denmark | Sept. 27, 1945 |